United States Patent

[11] 3,626,110

[72] Inventor Heinrich Halfmann
Korntal, Germany
[21] Appl. No. 883,908
[22] Filed Dec. 10, 1969
[45] Patented Dec. 7, 1971
[73] Assignee International Standard Electric Corporation
New York, N.Y.
[32] Priority Dec. 18, 1968
[33] Germany
[31] P 18 15 435.3

[54] GUIDE WIRE NETWORK WITH ONE AUXILIARY WIRE
6 Claims, 4 Drawing Figs.

[52] U.S. Cl. .................... 179/18 GE
[51] Int. Cl. .................... H04q 3/42
[50] Field of Search .................... 179/18 GE

[56] References Cited

UNITED STATES PATENTS 3,310,633 3/1967 Schonemeyer .............. 179/18 GE
3,347,995 10/1967 Schuter et al. ................ 179/18 GE

*Primary Examiner*—Kathleen H. Claffy
*Assistant Examiner*—William A. Helvestine
*Attorneys*—C. Cornell Remsen, Jr., Walter J. Baum, Percy P. Lantzy, J. Warren Whitesel, Delbert P. Warner and James B. Raden

ABSTRACT: A multistage cross-point network which uses at least one link between each stage. Each such link has a guide wire over which available path testing takes place. At each stage, the guide wires are connected to a signal amplifier. During a pathfinding process, the signal amplifier receives and transmits an offering signal to the amplifiers of the adjacent stage, an amplifier of the adjacent stage, if available, returns a catching signal. The amplifiers in the process are marked as being in a busy condition such that they are disabled from receiving further signals while in this condition, thus providing a busy marking.

GUIDE WIRE NETWORK WITH ONE AUXILIARY WIRE

Figure 1A:
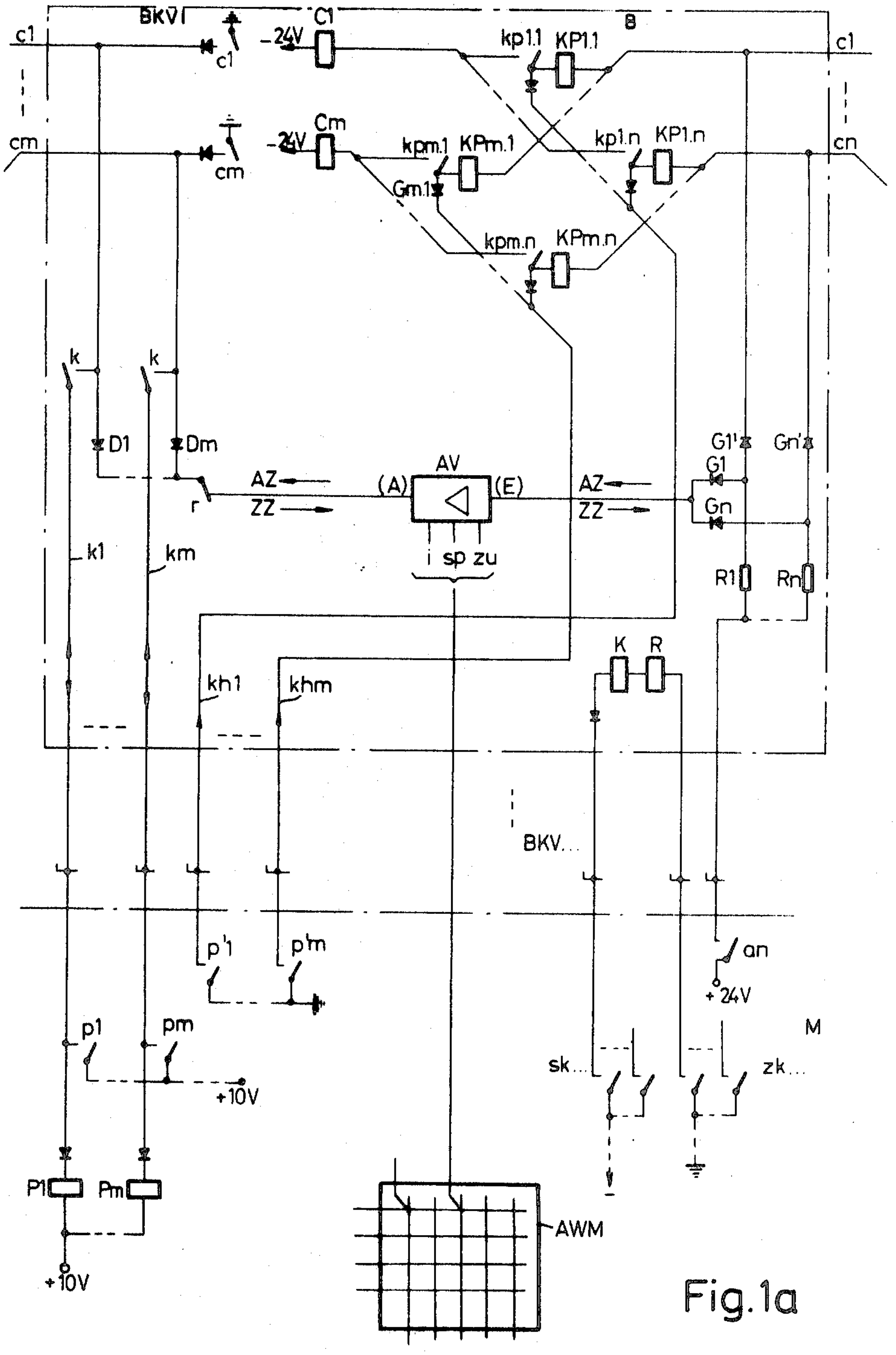

This invention relates to relay matrix control circuits using the guide wire principle, and more particularly to pathfinding systems having only one auxiliary wire per path.

For the conjugated control of a multistage cross-point array, it is necessary to find an available and idle path from an input to an output. After the path is found, cross-points are operated so that the through-connection can be carried out within the individual connecting stages. The switching operations for determining a suitable and idle path are briefly designated pathfinding and path selection.

It is known to use a separate guide wire network for pathfinding purposes. This network simulates the route possibilities in the cross-point array by providing one pathfinding or guide wire per interstage link in the cross-point array. Each cross-point multiple in a connecting stage has associated therewith an offering signal amplifier which interconnects the guide wires of a cross-point multiple. An offering signal is applied to end mark one input of the pathfinding network for pathfinding purposes.

This offering signal fans out in a forward or offering direction, via the offering signal amplifiers, and it reaches all outputs to which the marked input ma be connected. This fan-like spreading of the offering signal is achieved when each offering signal amplifier passes the offering signal, which it receives at its input, over the guide wires connected to its output. As the signal spreads, it is enabled or blocked subject to the momentary busy conditions within the cross-point array. Therefore, the offering signal applied to the guide wires passes over each wire only if the associated interstage link is then idle. The available route possibilities in the cross-point array are thus characterized.

One of the available and idle routes is selected in a catching operation. To this end, one of the outputs, of the guide wire network, reached by the offering signal has a catching signal applied thereto. The catching potential causes a selection chain to operate a cross-point multiple in each stage, the operation being in the reverse or catching direction as the stages progressively make the connection. This selection chain selects a guide wire which is passing offering potential and receiving a catching potential thereto.

Very often, cross-point relays are used which have only one winding. The winding of each cross-point relay is excited via a line or row marking wire, to which a reference potential may be applied. A cross-point assigned rectifier and a seizing wire, which belongs to the interstage link, is connected to a column of a cross-point matrix. The cross-point relay then doses its own contacts to complete a holding circuit which passes through a row-holding wire, to which holding potential is applied. The holding circuit also passes through the seizing wire of the interstage link connected to the particular column. This seizing wire passes a reference potential, and the switching potential is switched off. The switching potential and holding potential have opposite polarities with reference to the ground potential.

For marking a cross-point to carry out the switching operation, the intersection of the selected cross-point relay is automatically identified by its column and row. The catching signal always passes to the selected switching stage via only one wire. This wire is associated with an interstage link connected to a single row of a single cross-point matrix. Thus, one row of a cross-point matrix is clearly characterized. A column in the same cross-point matrix is identified by the selection of an interstage link passing the offering potential.

In this known arrangement, all of the guide wires leading to an offering signal amplifier are connected to a selection device. When this connection is to be made by relays, they must have a large number of contacts, and that means a slow response. Thus, it takes too much time to find a path through these multistage cross-point arrays, and consequently, the seizure time of the marker becomes intolerable.

One way to accelerate the path-selecting process is by selecting a cross-point matrix instead of an interstage link. However, prerequisite requires the interstage links to be arranged regularly, and two cross-point matrices in adjacent stages are interconnected by only one interstage link. Thus, when the cross-point matrices are selected, the path for the call is clearly fixed. The offering process remains unchanged; however, the catching process is carried out among the offering signal amplifiers. When an offering signal amplifier is selected, the catching potential is applied to all of the outgoing guide wires in the catching direction. In this pathfinding method, the cross-point matrix itself (and not the column and row) is defined in each connecting stage. The identities of the row and column of the selected cross-point relay are automatically provided when the cross-point matrices in the preceding and succeeding stages are selected.

To avoid undue expense in transmitting these identities to a marker, the required information is sometimes derived from the catching potential. When a test is made in a connecting stage to determine whether an interstage link leading is passing a catching potential, it is possible to discover which interstage link is marked with the catching potential. In a regular cross-point array, the identity of this interstage link provides information on the column of the selected cross-point matrix in the previous connecting stage and the row of the cross-point matrix in the next succeeding connecting stage, which is then being considered. The testing means corresponding to the articular interstage links are now in an excited condition. Thus, this means connects a ground source to connect a row-marking wire of the selected cross-point matrix in the connecting stage under consideration. The seizing wires of an interstage link leading to this connecting stage is connected to a source of switching potential. These switching operations may be simultaneously carried out in all of the connecting stages. Therefore, the duration of path selection and thus the seizure time of the marker for one call may be considerably shortened.

Multiple utilization of the guide wires would be possible if other criteria could also be transmitted. For example, the offering and catching signals may have the same polarity, but be at different levels. Potentials of the other polarity and the ground potential may be used on the same guide wire for different purposes. Thus, these potentials may be used for transmitting counting pulses, providing busy signals, etc.

In yet another arrangement, pathfinding, through-connecting, and holding are effected via a single auxiliary wire. Here, the catching potential on this auxiliary wire, causes a selecting device to be switched on for selecting an interstage link, and at the same time acts as a column switching potential for operating a cross-point relay which is row-marked with reference potential. The identity of this row is provided when an outgoing interstage link is selected. Thus, this arrangement reduces expense (only one auxiliary wire per interstage link), but the time consumption is too great.

Accordingly, an object of the invention is to provide for the control of a multistage cross-point array by combining the best advantages of these prior arrangements. Here, an object is to utilize only one auxiliary wire (per interstage link) for pathfinding, path selection, through-connecting, and holding of the path. Another object is to reduce the seizure time of the marker.

These and other objects are achieved by a novel circuit arrangement for controlling a multistage relay cross-point array. The offering and catching signals are used for pathfinding. Only one auxiliary wire is required per interstage link for setting up and holding the paths. An offering signal amplifier is associated with each cross-point multiple or matrix. The inputs and outputs of these amplifiers are connected to the auxiliary wires of the associated cross-point multiple in columns (offering direction) and rows (catching direction). The winding of a cross-point relay is connected between a row and a column. On one side, this connection is made to a row-marking wire via a cross-point assigned rectifier and via the cross-points own holding contact to the holding potential. The other side of the cross-point is connected to the auxiliary wire of the interstage link associated with the column. The auxiliary wires of the seized interstage links have an impressed holding counterpotential applied thereto. This potential also serves as reference potential for pathfinding and path selection. More particularly, the inventive process is accomplished by a combination of the following features:

In the course of path selection, an offering signal amplifier is selected in each connecting stage. An offering potential is applied in the offering direction, and a catching potential in the catching direction. The catching potential is applied to all the auxiliary wires which lead from the selected offering signal amplifier in the catching direction and which are used in pathfinding;

b. When an offering signal amplifier has been selected, a marker relay assigned thereto individually connects the auxiliary wire leading in the catching direction to testing means adapted to respond to the catching potential;

c. On one side, the testing means connects the auxiliary wire via the marker relay contacts to a source of switching potential. On the other side, the marking wire of the row of the cross-point matrix associated with the interstage link is connected to a source of switching counterpotential.

This pathfinding and switching arrangement is based on the selection of cross-point matrices in the individual connecting stages. The offering, catching, switching, and holding are all carried out on a single auxiliary wire of the interstage link. The holding circuit is formed, section by section, from one connecting stage to the next by the contact of a relay individually associated with the interstage link. The holding potential applied via the contacts of these relays also serves as the reference potential for pathfinding purposes. Seized and busy marking guide wires no longer take part in pathfinding.

Figure 1B:
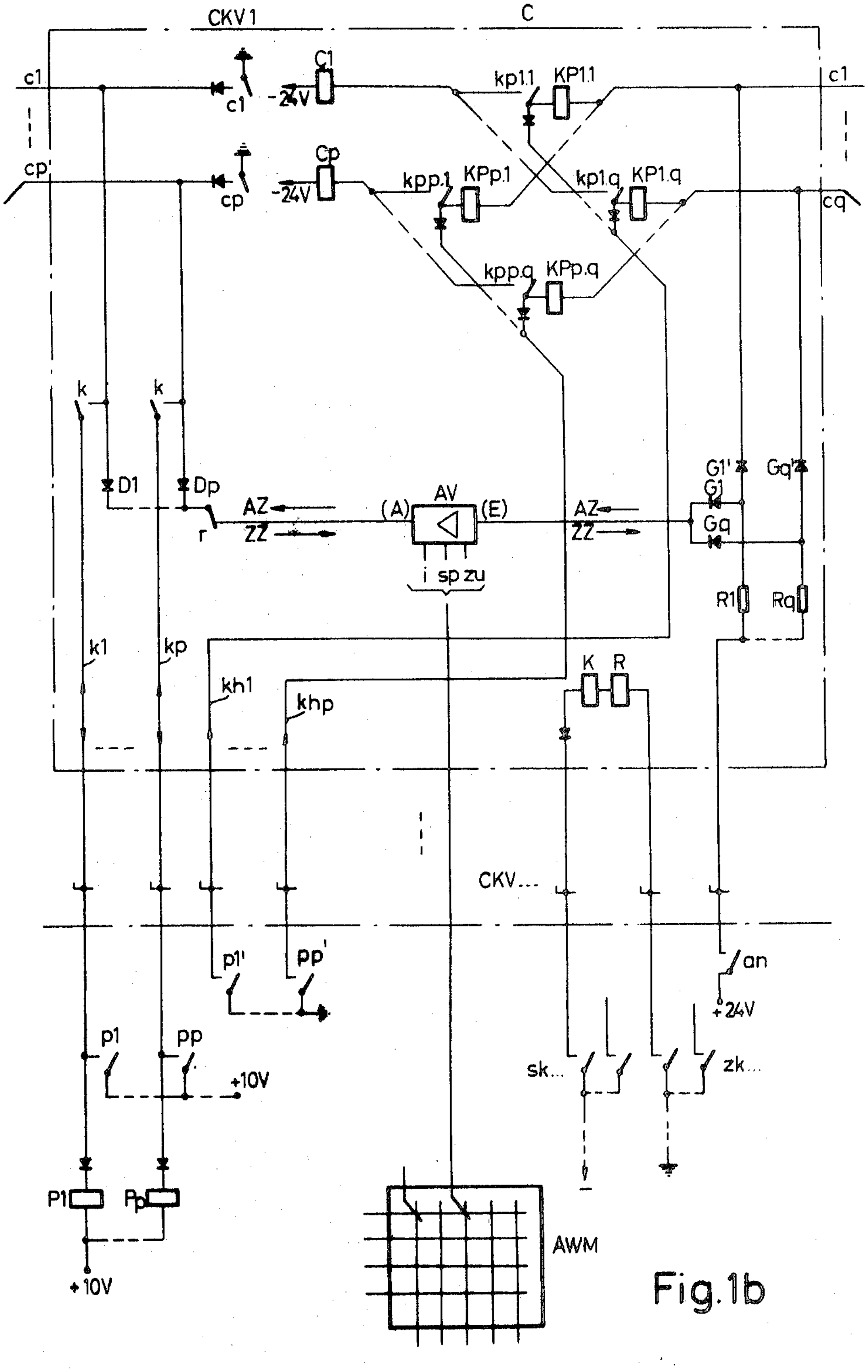
Figure 2:
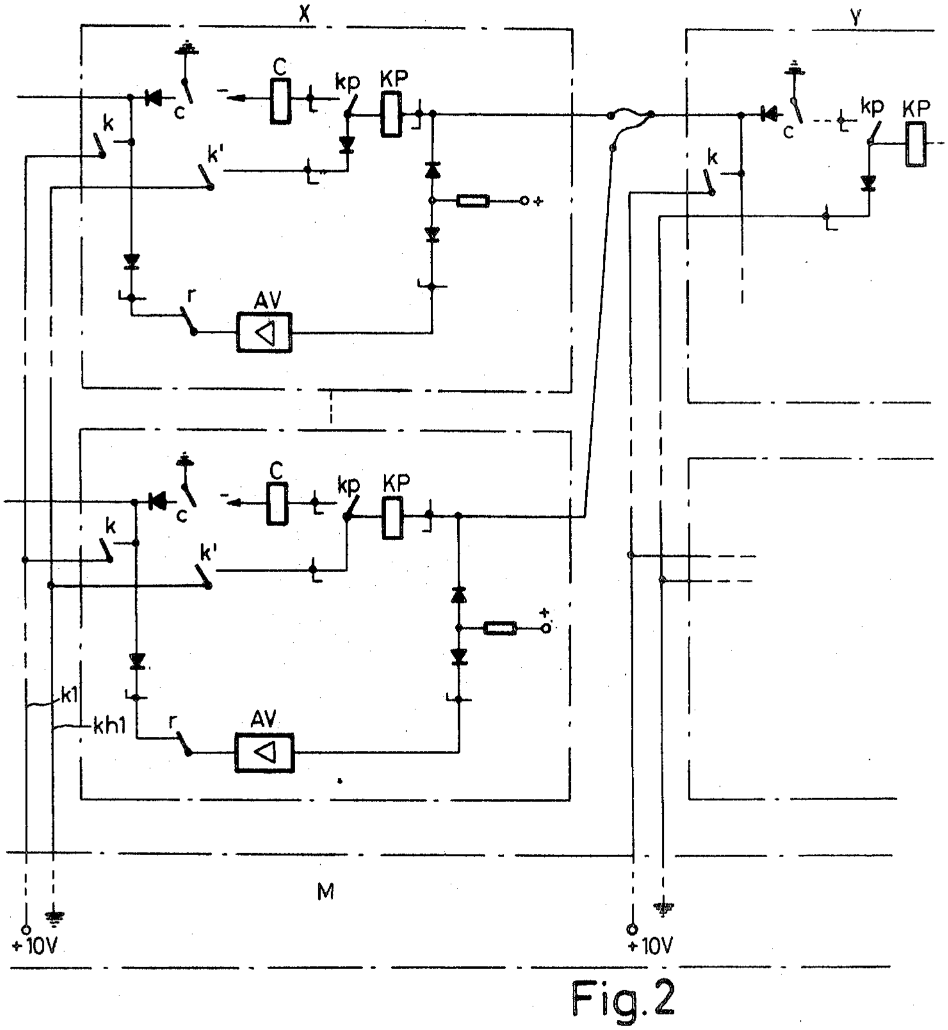
Figure 3:
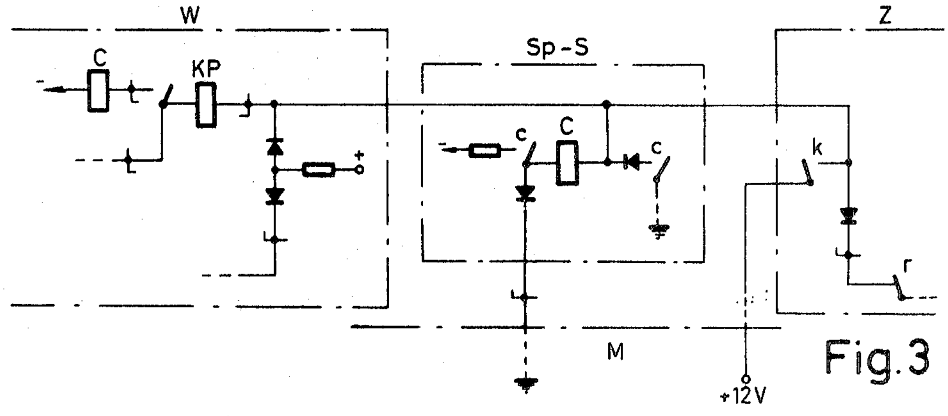

The above-mentioned and other features and objects of this invention and the manner of obtaining them will become more apparent, and the invention itself will be best understood by reference to the following description of an embodiment of the invention taken in conjunction with the accompanying drawings, in which:

FIG. 1*a* and 1*b* are the circuit programs of guide wires interconnected by two connecting stages;

FIG. 2 shows a modification of the circuits for an optional network structure; and FIG. 3 demonstrates the inclusion of terminating means in the pathfinding guide wire network.

The switching operations for pathfinding and path selection as well as for setting up and holding a path are described below with reference to FIGS. 1*a* and 1*b*.

Offering and catching signals fall into the same potential range between the ground potential and +24 volts. An interstage link passing an offering potential is marked by +10 volts at most. An interstage link passing a catching potential has approximately +24 volts.

In FIG. 1 one cross-point matrix BKV1 and CKV1 is shown in each of the connecting stages B and C. Each such connecting stage has a number of such cross-point matrices, as indicated by the reference letters BKV... and CKV.... The number of cross-point matrices and their design as regards the inputs *cl* to *cm* and *cl* to *cp* and the outputs *cl* to *cn* and *cl* to *eq*, respectively, depend on the chosen network construction.

During pathfinding, the contacts *an* in the marker M are closed. Consequently, the catching potential (+24 volts) passes through the resistors R1 to Rn and R1 to Rq, respectively, to the interstage links. These interstage links are grouped together at the output of a cross-point matrix BKV1 or CKV1, the grouping being via decoupling diodes G1 to Gn and G1 to Gq, respectively. All such diodes are connected to the input E of the offering signal amplifier AV. The decoupling diodes G1′ to Gn′ and G1′ to Gq′ ensure decoupling of the interstage links *cl* to *cn* and *cl* to *dq*, respectively. Similarly, the interstage links at the input of a cross-point matrix are grouped together via decoupling diodes D1 to Dm and D1 to Dp connected to the output A of the offering signal amplifier AV.

In this arrangement, the +24 volts potential can be applied in each stage through the resistors, independently, to each of the interstage output links *cl* to *cq* and *cl* to *cn*. Thus, in the connecting stage B, the input E of the offering signal amplifier AV is associated with the interstage link, and also with the output A of the offering signal amplifier Av in the next following connecting stage C.

In the idle state (no pathfinding), the marker M blocks all of the offering signal amplifiers AV via their control inputs *sp*, that is to say, the outputs A of the amplifiers AV. Thus, all of the interstage links connected thereto are at ground potential. During pathfinding, the same switching condition holds, when an offering signal amplifier AV receives no offering signal AZ from the previous connecting stage.

In the arrangement shown, offering occurs from connecting stage C to connecting stage B; whereas, catching is carried out in the opposite direction. In the cross-point matrix CKV1, the offering signal AZ occurs when an offering signal amplifier switches off the ground potential at the output A if the associated interstage link is then idle.

In the cross-point matrix CKV1, the +24 volts potential can now pass through to the input E of the offering signal amplifier. The offering signal amplifier responds and switches off the ground potential at its output A. The disappearance of ground potential at the output A of the offering signal amplifier AV, in the cross-point matrix CKV1, is sensed in all of the cross-point matrices, in connecting stage B, which are accessible via the interstage links *cl* to *p*. Therefore, in the cross-point matrix BKV1, this sensing is an offering signal. The prerequisite is that the interstage link *cl* between the cross-point matrices CKV1 and BKV1 is idle. That is, that the line is idle if relay C1 in the cross-point matrix CKV1 has not closed its contact *cl* Another cross-point matrix in the connecting stage B is selected in the same manner via the interstage link *cp*.

The offering signal thus spreads fanlike from connecting stage to connecting stage, over the entire cross-point array. During this process, the input E of the offering signal amplifier AV acts in a voltage-stabilizing manner on the potential of the interstage link. Each interstage link carries a potential of approximately +10 volts, which remains nearly constant, irrespective of the number of links carrying offering potential.

The selection of the cross-point matrices is effected in the usual manner. During the catching operation, the offering signal amplifier AV will be selected, in a cross-point matrix connecting stage. The catching is accomplished by the marker M acting through the selection matrix AWM upon the control input *zu*. The offering signal amplifier AV then changes its input resistance toward infinity, with the result that the diodes G1 to Gn are blocked in the cross-point matrix BKV1. The +24 volts potential can then pass unhindered through the resistors R1 and Rn to the offering potential +10 volts being passed on the interstage links.

This higher +24 volts catching potential passes through the output A, of the offering signal amplifier AV, in the connecting stage C to the control line *i* of the amplifier. This line is also galvanically coupled to the output A. In the selecting matrix AWM of the marker M, this control line *i* leads to a high-resistance evaluating device. The incoming interstage links *cl* to *cp*, in the cross-point matrix CKV1 act as an OR circuit. The highest potential (e.g. +24 volts) on any one of these interstage links passes to the control line *i* of the related offering signal amplifier. The associated evaluating device in the marker receives the catching signal. During the catching operation, the offering resistance of the idle interstage links is in series with a high-resistance evaluating device. Thus, only a small voltage drop occurs across the offering resistance, and the +24-volt potential appears in almost full value at the evaluating device of the selection matrix AWM.

Each selection matrix AWM contains, a testing circuit (not shown) which can only respond to the catching signal. This testing circuit controls the row and column selecting chain of the selection matrix AWM so that the row and column contacts *zk* and *sk*, respectively, are set for the selection of the cross-point matrix BKV1. The cross-point matrix suitable for setting up the path is clearly defined by the setting of this row and column selecting chain.

On the completion of the pathfinding operation, the switching windings K and R, which are independently associated with the cross-point matrices, are energized in each of the selected cross-point matrices BKV1 and CKV1 in all connecting stages. At this stage, the offering signal amplifiers AV of the entire cross-point array may already be blocked again via their control inputs *sp*.

In order to gain the selected path identification information during switching. It is necessary for the marker M to be connected via the wires *zu* to the selected offering signal amplifier. In each selected cross-point matrix, the contacts *k* are operated by the matrix-assigned switching component K. These contacts switch the incoming interstage links *c1* to *cm* and *c1* to *cp* over to testing means P1 to Pm and P1 to Pp, respectively. This testing means can check for catching signals at +24 volts. The same-grade coupling wires *k1* to *km* and *k1* to *kp* and the same-grade marking wires *kh1* to *khm* and *kh1* to *khp*, respectively, are connected in multiple within each connecting stage.

The catching signal ZZ sent from the cross-point matrix CKV1 to the cross-point matrix BKV1 appears at the testing means P1 to Pp in the marker M, but only when the contact *r* in the cross-point matrix CKV1 has opened to switch the input interstage links *c1* to *cp* to cut them off from the output A of the offering signal amplifier AV. This cutting-off operation is necessary, since an offering signal amplifier AV will again carry ground potential at its output A when it is selected via the catching control input *zu*. The offering signal amplifier AV behaves during the catching operation as if it had never received any offering signal AZ.

First, it should be assumed that the cross-point array is constructed in a regular manner. There is only one connecting facility, i.e., a single interstage link, between any two cross-point matrices of adjacent connecting stages. It is also assumed that during the pathfinding and path-selection operations, the cross-point matrices BKV1 and CKV1 shown in FIGS. 1*a* and 1*b* have been selected. Thus, in the connecting stage C, all of the interstage links *c1* to *cp* are switched to the testing means P1 to Pp.

The switching components K and R of the cross-point matrix CKV1 are excited via the row and column contacts *zk* and *sk* of the marker M. The +24-volt catching signal ZZ appears at the input *c1* of the cross-point matrix CKV1. This signal can pass through the resistor R1 in the cross-point matrix BKV1 and the outgoing interstage link *c1*.

The switching component P1 responds in the marker M, and its contact *p1* prepares the coupling or switching circuit for a cross-point relay in the connecting stage B. At the same time, the contact *p1' prepares the switching circuit for a cross-point relay in the connecting stage C. Similarly, a testing means responds in all of the other connecting stages. When the input* *cm* in the cross-point matrix BKV1 receives a catching signal ZZ from the previous connecting stage (not shown), the testing means Pm responds in the marker M. The following circuit is then closed for operating the cross-point relay in the cross-point matrix BKV1. Ground, contact *p'm* to the connecting stage B, marking wire *khm*, diode Gm1, cross-point relay KPm1, outgoing interstage link *c1* leading to the input *c1* of the cross-point matrix CKV1, contract *k* coupling wire *k1*, contact *p1*, and the source of coupling or switching potential of +10 volts. A switching potential of +24 volts could be used in place of the switching potential of +10 volts.

The operating circuits are built up in the same manner in all of the other connecting stages. The +10-volt switching potentials and the switching counter or ground potential are applied, via the marker M, to all connecting stages simultaneously whenever a testing means is excited in each connecting stage.

As indicated by the contacts *an* in the marker M, the +24-volt potential can be switched. This means that the value of the offering resistances may be optional. The +24-volt CKV. a supporting effect in the holding circuit design the cross-point relay, inputs through the offering resistance. Therefore, cm drop conditions need be maintained *cp* and the outputs *cl* to *cn* and *cl* to *cq*, for the cross-point relay KP and the relay C in the independently associated interstage link. When the switching potentials are switched on, the +24-volt potential may have already been switched off so that the relays of a releasing path can drop during the switching or coupling phase or in the idle state.

In place of the testing means P1 to Pm and P1 to Pp, threshold indicators may have a very high input resistance. These indicators respond to the catching potential of +24 volts. The voltage drop across the offering resistors R1 to Rn and R1 to Rq are then negligible. The switching components P will then be controlled by the indicators.

FIG. 2 shows a modification of the control circuits for use when the cross-point array has no regular distribution of interstage links. In the combination shown in FIG. 2, two interstage links of different cross-point matrices in the connecting stage X lead to the same input of a cross-point matrix in the connecting stage Y. In the embodiment shown, the interstage links originating in the cross-point connecting stage X are of the same grade and pass through the coupling wire *k1* and the marking wire *kh1* to the marker M. To avoid double paths in this type of combination the testing means P... in the marker M must include a lockout circuit which prevents more than one testing means from being operated per connecting stage. In the selected cross-point matrices, it is also necessary to ensure that the marking wires *kh1* to *khm* are broken via the switching component K. This measure is indicated by the contacts k'.

Then, pathfinding and path selection occur in the same manner described above with reference to FIGS. 1 *a* and 1 *b*. The manner of switching and holding the cross-point relays remains unchanged.

The terminal equipments are directly connected to the pathfinding wires. For example, these equipments may be subscriber circuits or junctors connected to the input or output of the cross-point array. The seizing relay C of such equipment is connected in parallel with the cross-point relay in the pathfinding wire. This relay is also excited during the switching operation. In this case, the terminal equipment is not determined by an individual selection, but is included in the pathfinding process involving the selection of cross-point matrices. To this end, the interstage links passing through this terminal equipment are combined to form a hypothetical cross-point matrix without any cross-point relays. These matrices serve pathfinding purposes only. Such cross-point matrices are reduced to offering signal amplifiers, which either initiate the offering process and evaluate the catching signal, as shown in FIG. 3--which is an example of a junctor Sp-S. Or, these matrices may evaluate the offering signal and initiate the catching process.

The inputs of this hypothetical cross-point matrix are found in the hypothetical connecting stage Z. These stages are connected, in a regular arrangement, to the outputs of the last connecting stage W, the terminal equipment being so connected thus form interstage links. Pathfinding and switching occur via this hypothetical cross-point matrix in the manner already explained.

While the principles of the invention have been described above in connection with specific apparatus and applications, it is to be understood that this description is made only by way of example and not as a limitation on the scope of the invention.

I claim:

1. A guide wire matrix for controlling a cascaded multistage switching network wherein each stage has a plurality of switching matrices, said guide wire matrix comprising a link between each stage of said network and one auxiliary wire per interstage link, an amplifier per switching matrix, the inputs of said amplifiers each being connected via OR gates to the auxiliary wires associated with columns in its own switching matrix, the outputs of said amplifiers each being connected via OR gates to the auxiliary wires associated with rows in its own switching matrix, means responsive to a pathfinding signal for applying to said auxiliary wires an offering signal in one direction and means responsive to an idle matrix in the adjacent stage for applying to the wires a catching signal in the opposite direction, means responsive to a coincidence of said offering and catching signals on an auxiliary wire for operating the amplifier at the matrix where said coincidence occurs, marker means operated responsive to the operation of said amplifier, and testing means connected between each auxiliary wire and said marker means for selecting an amplifier in a switching matrix of each stage.

2. The matrix of claim 1 wherein said catching signals are of one potential applied to one end of said auxiliary wires via resistors, each amplifier having means for reducing said one potential to a level which controls the next cascaded stage in said network, idle equipment signals at ground potential applied to the other end of said auxiliary wires, means for applying an offering signal by removing said ground potential to produce a catching signal, and means for applying said catching signal by raising the input resistance of said amplifier.

3. The matrix of claim 2, and means for indicating the idle state of amplifiers by blocking said amplifiers, to prevent an offering signal from appearing at the amplifier output.

4. The matrix of claim 2, wherein the OR gates at the outputs of said amplifiers are decoupling diodes, and wherein there are seizure indicating control means galvanically connected to the output of each amplifier.

5. The matrix of claim 2, and means responsive to the selection of an amplifier in a stage for selecting a cross-point in that stage, and means for blocking the input of said selected amplifier while said cross-point selection is in process.

6. The matrix of claim 2 and further including means in each switching matrix for disconnecting the interstage link adjacent that stage from the output of the amplifier of that stage and to connect said testing means in lieu thereof.

* * * * *